United States Patent Office 3,575,716
Patented Apr. 20, 1971

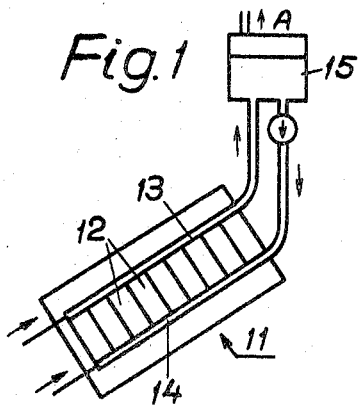
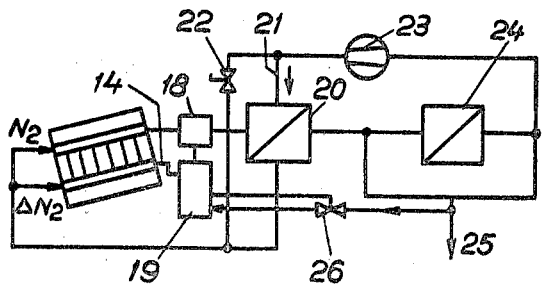
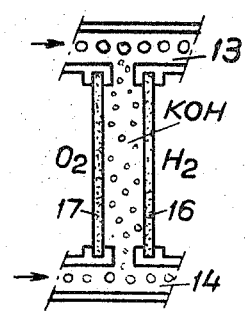
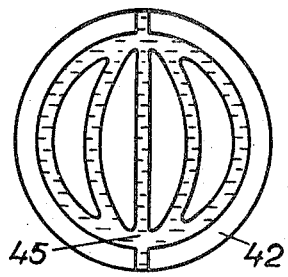
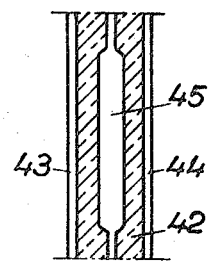
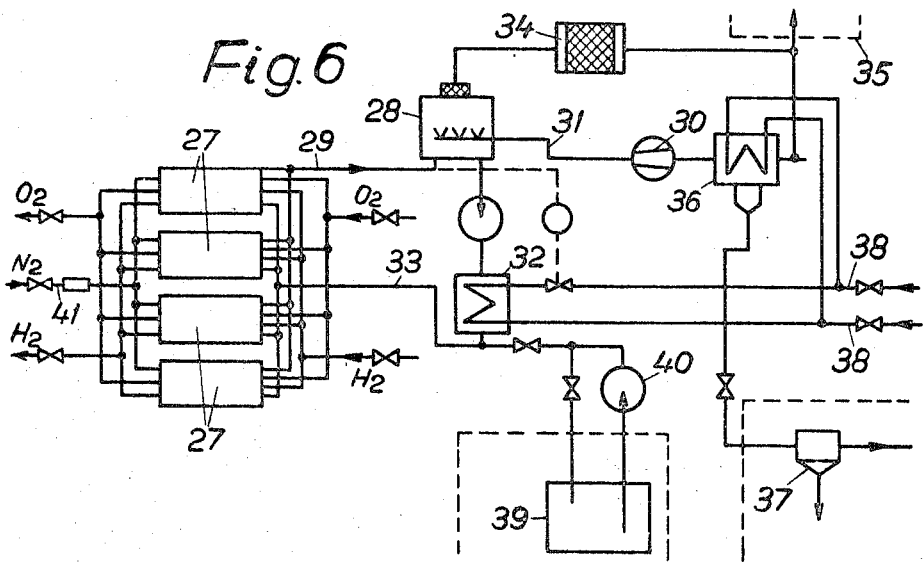

3,575,716
METHOD OF OPERATING A FUEL CELL BATTERY HAVING SLOPING INLET AND OUTLET CHANNELS
Olle Lindstrom, Vasteras, Sweden, assignor to Allmanna Svenska Elektriska Aktiebolaget, Vasteras, Sweden
Filed Dec. 11, 1967, Ser. No. 689,474
Claims priority, application Sweden, Dec. 14, 1966, 17,109/66
Int. Cl. H01m 27/12
U.S. Cl. 136—86　　　　　　　　　　　　　　　1 Claim

ABSTRACT OF THE DISCLOSURE

In a fuel cell battery which comprises electrodes and spaces therebetween and also outer spaces outside the electrodes for a combustible substance or oxidant respectively, there are two channels, one inlet and one outlet channel. At least the outlet channel is arranged at an angle to the horizontal plane and with its uppermost part connected to a device for feeding back electrolyte to the inlet channel.

BACKGROUND OF THE INVENTION

(1) Field of the invention

The present invention relates to a fuel battery (fuel cell battery) including electrodes and inlet and outlet channels for fluid electrolyte.

(2) The prior art

A fuel battery consists of one or more stacks, each composed of a number of fuel cells. A fuel cell for generating electric energy by means of a reaction between a continuously supplied combustible substance, such as for example hydrogen, and a continuously supplied oxidant, such as for example oxygen, consists in its simplest form of a suitable fluid electrolyte, such as potassium hydroxide and two porous (sintered) electrodes of porous nickel or porous nickel plus silver, one of these, normally the last mentioned type of electrode, being arranged between the electrolyte and the oxygen and the other between the electrolyte and the hydrogen. A number of cells is built together to form a stack and by building together several stacks and suitably series-and parallel-connecting the different cells, a suitable open circuit voltage is obtained for the fuel battery.

One problem with such fuel batteries and with the fuel cells included is that leaking oxygen and hydrogen together form in the battery explosive oxyhydrogen gas. It is thus important that such leaking gas is rapidly made harmless and/or removed from the battery. It is extremely unsuitable to have pockets or other spaces in the battery in which such gas can collect and possibly cause damage.

SUMMARY OF THE INVENTION

The invention is a solution to these and other similar problems, and is characterised in that at least the outlet channel (usually both channels) is, in the normal position of the battery, arranged to slope towards the horizontal plane with the uppermost part connected to means for returning the electrolyte to the inlet channel. (By "normal position" is meant for example, the position in a ship where the trim and roll angle is zero, or more generally, placed on a horizontal base.) Regardless of trim and roll angles arising when the ship is in motion or unevenly loaded, the leaking gas will flow out of the battery through the outlet channel and the battery will thus be substantially safe from explosion. The angle should lie between 10° and 35° to the horizontal plane (in normal position, suitably about 20°).

In a particularly preferred embodiment the outlet and possibly also the inlet channel for electrolyte is connected to nitrogen or inert gas supply conducts in order to blow in nitrogen or the like into the channels and other electrolyte spaces. The advantage of this is that nitrogen is mixed with leaking oxygen and hydrogen and thus decreases the risk of explosion and that the leakage gas is rapidly removed from the battery with the help of the nitrogen. Another advantage is that the nitrogen increases the resistance in the channels and the electrolyte chamber and thus decreases leakage currents which otherwise would decrease the efficiency of the battery, particularly at low load and upon a break in the supply of driving medium, might even lead to total voltage equalisation in the battery and unfavourable effects on the active substances in the electrodes as a consequence.

BRIEF DESCRIPTION OF THE DRAWINGS

The accompanying FIG. 1 shows a diagram of a fuel battery according to the invention, FIG. 2 shows a circuit diagram for a circulation system to the fuel battery according to the invention, FIG. 3 shows a detailed view of a fuel cell with gas being blown in, FIGS. 4 and 5 show a matrix with electrodes and FIG. 6 a circulation diagram for a fuel battery having several stacks.

DESCRIPTION OF THE PREFERRED EMBODIMENTS

FIG. 1 shows a stack 11 forming a fuel battery with a number of fuel cells 12 placed one after the other at an angle of 20°. The angle should be between 10° and 35° with a trim and roll angle zero when the battery is placed in a ship or, in general, when it is placed on a horizontal base. The outlet channel 13 for electrolyte is connected at its uppermost part to a system 15 for removing water and circulating electrolyte and in the case shown this also applies to the inlet channel 14. Leakage gas ($H_2+O_2$) leaves at the arrow A.

The fuel battery is of the so-called integrated type, that is, the systems for cooling, water removal and circulation of electrolyte, are built into the battery as a unit. Connections for this compact "power packet" need only be made to gases and coolant. FIG. 3 shows a single fuel cell with two electrodes of porous nickel+silver 17 and porous nickel 16, respectively, the space between which is filled with electrolyte, in this case potassium hydroxide (KOH). Nitrogen ($N_2$) is blown into the outlet channel 13 and a smaller quantity of nitrogen ($\Delta N_2$) is blown into the inlet channel. See also FIG. 2. Outside the electrode 17 is a space for oxygen and outside the electrode 16 a space for hydrogen. $N_2$ bubbles are transported along the channels 13 and 14 and between the electrodes 16 and 17 so that the risk of explosion due to explosive gas formed in the electrolyte by $H_2$ and $O_2$ is reduced. Leakage may occur through the electrodes and without nitrogen or some other inert gas this risk would be considerable. The leaking gases are transported out of the battery with the nitrogen. The gas which is introduced into the system is saturated with water vapour which can be utilized for cooling and water removal. Due to the gas flow in the outlet channel 13, suction is obtained at the outlet from the electrolyte chamber and the battery can be driven in sloping condition without the upper part of the electrolyte chamber becoming filled with gas. Electrolyte and nitrogen with water, water vapour and gas ($H_2$, $O_2$) are led to a separator 18 for electrolyte and water (scubber+recombiner, see below), and the electrolyte is separated into an electrolyte chamber 19 and returned suitably mixed with condensate to the lower channel 14 of the battery. Other material supplied to the separator 18 is transported to a condenser 20 where it is cooled by fresh nitrogen in the conduit 21 supplied by the fan 23. The cooled mixture is transported to a second cooler 24 where the water is separated at 25 and condensate is taken to the electrolyte chamber 19 in quantities determined by the valve 26. After cooling in the cooler 20 the nitrogen is mixed with freshly supplied nitrogen and blown into the battery through the cooler or condenser 20 and through a parallel conduit with a temperature-controlled valve 22. Possibly the system may be combined with an extra cooler (not shown) for the returning electrolyte, which causes smaller gas flows, particularly at high powers when the water produced is considerably less than the quantity required for vaporisation as coolant.

A more detailed embodiment of the system according to FIG. 2 is shown in FIG. 6 which shows a battery having four stacks 27, each containing a number of modules with their fuel cells. Oxygen ($O_2$) and hydrogen ($H_2$) are supplied to appropriate chambers, as is clear from the figures, and a certain quantity of $H_2$ and $O_2$ is removed from the battery for reasons of ventilation. The sloping stacks (not seen from FIG. 6) have a common outlet conduit 29 in which electrolyte+$N_2$+a certain quantity of $H_2$ and $O_2$ are transported to a chamber 28 with a filling of nickel wire mesh connected to a conduit 31 for nitrogen provided with a fan 30. Electrolyte separated in the chamber 28 is led from this through a cooler 32 back to the battery through a conduit 33.

Nitrogen with the addition of oxygen is led from the chamber 28 to a recombiner 34 in which free hydrogen is removed and water is formed. The latter is removed at 35 and the nitrogen is led through the cooler 36 to the chamber 28. Water formed+certain quantities of nitrogen are led to a second separator 37 and the condensate is returned in a manner not shown in FIG. 6, but according to FIG. 2. The inlet water (at 38) is used as coolant in the two coolers 32 and 36, thus cooling the electrolyte and nitrogen. Fresh electrolyte from a container 39 is pumped up (40) and mixed with cooled, returning electrolyte (and a suitable quantity of water or condensate from 37) and is pumped into the battery through the conduit 33 and its branches.

It is thus seen how cold electrolyte is pumped into the battery again as well as cooled nitrogen (at 41, coming from 35 and from a separate nitrogen source, not shown) and how water vapour is separated and returned and how leaking gas is separated from the circulating medium.

FIGS. 4 and 5 show an alternative type of fuel cell with free electrolyte or electrolyte in a porous body. The advantage of making the electrolyte as a body of this type is that the mechanical strength of such constructions is improved and the risk of gas leakage decreased.

The cell is here built up of porous matrix material 42, such as asbestos, sintered together with electrodes 43, 44 and having grooves 45 in the matrix 42. As can be seen (FIG. 5) two electrodes of this sintered construction are placed together and form a fuel cell having channels for the flow of electrolyte. It is, of course, possible to vary the degree of freedom of the electrolyte flow in the porous body, within the scope of the invention.

The object of the invention may occur in a considerable number of variations within the scope of the following claim.

I claim:
1. A method of operating a fuel cell battery, which battery comprises pairs of electrodes having spaces for fluid electrolyte between the electrodes of each pair and inlet and outlet channels for the fluid electrolyte opening into said spaces, and having means forming spaces for containing combustible substances and oxidants at the faces of said electrodes opposite the electrolyte spaces, an explosive mixture being formed when said combustible substances and oxidants leak into said electrolyte spaces, at least the outlet channel for the electrolyte slopping with respect to a horizontal plane, the invention which comprises feeding electrolyte to said inlet channels through said electrolyte spaces and into said outlet channel, supplying an inert gas to the lowermost part of the outlet channel and to one end of the inlet channel thereby decreasing the risk of explosion of said explosive mixture, withdrawing the electrolyte and inert gas entrained therewith from the uppermost part of the outlet channel, separating gas from the electrolyte, and returning the electrolyte freed of gas to the inlet channel.

References Cited

UNITED STATES PATENTS

| | | | |
|---|---|---|---|
| 1,807,595 | 6/1931 | Kershaw | 136—134 |
| 1,781,005 | 11/1930 | Gill | 136—162.05 |
| 3,364,070 | 1/1968 | Alexander | 136—86 |
| 3,457,114 | 7/1969 | Wedin | 136—86 |

ALLEN B. CURTIS, Primary Examiner

M. J. ANDREWS, Assistant Examiner